United States Patent
Lin et al.

(10) Patent No.: US 7,652,446 B2
(45) Date of Patent: Jan. 26, 2010

(54) METHOD FOR DETECTING AND CONTROLLING OUTPUT CHARACTERISTICS OF A DC MOTOR AND A SELF-PROPELLED APPARATUS USING THE SAME

(75) Inventors: Janq-Yann Lin, Hsinchu (TW); Yong-Lin Kuo, Taipei (TW); Yaw-Nan Lee, Hsinchu (TW); Yann-Shuoh Sun, Taipei County (TW); Ching-Chi Liao, Taichung County (TW)

(73) Assignee: Industrial Technology Research Institute, Hsinchu (TW)

( * ) Notice: Subject to any disclaimer, the term of this patent is extended or adjusted under 35 U.S.C. 154(b) by 271 days.

(21) Appl. No.: 11/756,373

(22) Filed: May 31, 2007

(65) Prior Publication Data

US 2008/0253752 A1 Oct. 16, 2008

(30) Foreign Application Priority Data

Apr. 13, 2007 (TW) ............................... 96112959 A

(51) Int. Cl.
*G05F 1/10* (2006.01)
(52) U.S. Cl. .................. 318/650; 318/638; 318/560
(58) Field of Classification Search ................. 318/650, 318/638, 560; 388/824
See application file for complete search history.

(56) References Cited

U.S. PATENT DOCUMENTS

| | | | |
|---|---|---|---|
| 3,581,172 A | 5/1971 | Tsuboi et al. | |
| 5,502,363 A | 3/1996 | Tasch et al. | |
| 5,811,668 A * | 9/1998 | Kondoh et al. | ........... 73/116.05 |
| 6,084,334 A * | 7/2000 | Yamamoto et al. | ..... 310/316.01 |
| 6,320,338 B1 * | 11/2001 | Kang | ........................ 318/430 |
| 6,633,144 B2 * | 10/2003 | Barker et al. | ........... 318/400.09 |
| 6,700,400 B2 * | 3/2004 | Atarashi | ..................... 324/772 |
| 6,903,528 B2 * | 6/2005 | Komiya | ..................... 318/611 |
| 7,078,871 B2 * | 7/2006 | Boscolo et al. | ............. 318/270 |
| 7,122,982 B2 * | 10/2006 | Sasaya et al. | ............... 318/293 |
| 2005/0143650 A1 | 6/2005 | Winkel | |

FOREIGN PATENT DOCUMENTS

CA 2396275 10/2000

(Continued)

OTHER PUBLICATIONS

Dan Henriksson, Rolf Johansson and Anders Robertsson "Observer-based Impedance Control in Robotics", Jul. 2001.

(Continued)

*Primary Examiner*—Bentsu Ro
*Assistant Examiner*—David S Luo
(74) *Attorney, Agent, or Firm*—WPAT, PC; Justin King

(57) ABSTRACT

A method for detecting and controlling output characteristics of a DC motor is provided in the present invention, wherein an input impedance related to the DC motor is measured for analyzing the output characteristics of the DC motor so that the output characteristics of the DC motor is capable being controlled according to the requirement of usage. By means of the foregoing method, the present invention further provides a self-propelled apparatus which functions to detect and control the output of the DC motor for maintaining the moving speed according to the environment status and road condition.

18 Claims, 8 Drawing Sheets

FOREIGN PATENT DOCUMENTS

| | | |
|---|---|---|
| EP | 0816005 | 1/1998 |
| JP | 2083188 | 3/1990 |
| JP | 5150804 | 6/1993 |
| JP | 6114757 | 4/1994 |
| JP | 7024758 | 1/1995 |
| JP | 7080786 | 3/1995 |
| JP | 7132473 | 5/1995 |
| JP | 8000687 | 1/1996 |
| JP | 8243958 | 9/1996 |
| JP | 8243959 | 9/1996 |
| JP | 10230489 | 9/1998 |
| JP | 10231100 | 9/1998 |
| JP | 10329071 | 12/1998 |
| JP | 2001038664 | 2/2001 |
| JP | 2001038673 | 2/2001 |
| JP | 2001088079 | 4/2001 |
| JP | 2001277162 | 10/2001 |
| JP | 2003024397 | 1/2003 |

OTHER PUBLICATIONS

Shih-Fu Ling, Xiaoyan Hou, Yi Xie "Decoupling loading effect in simultaneous sensing and actuating for dynamic measurement", Apr. 2005.

* cited by examiner

altering an input characteristic of the DC motor while using a sensing device to detect an output torque and a rotation speed of the DC motor for obtaining a plural sets of numerical data including voltage, current, torque and rotation speed  31 performing a mathematical calculation upon the plural set of numerical data by a numerical analyzing technique for obtaining the operator  32

FIG. 3B

METHOD FOR DETECTING AND CONTROLLING OUTPUT CHARACTERISTICS OF A DC MOTOR AND A SELF-PROPELLED APPARATUS USING THE SAME

FIELD OF THE INVENTION

The present invention relates to a direct current (DC) motor control method and apparatus, and more particularly, to a method capable of detecting and measuring input impedance related to a DC motor while basing upon the detection/measurement to analyze the DC motor's output characteristics to be used for controlling the output of the DC motor.

BACKGROUND OF THE INVENTION

A self-propelled apparatus is a robotic mobile intelligent device that is able to make decisions or take a detour to avoid obstacles according to the conditions of roads automatically and independently. For instance, it can be adapted for powered wheelchairs for enabling the same to recognize an uphill and accelerate accordingly, or to recognize a downhill and decelerate automatically. In addition, as it is designed to make an evaluation to determine whether to take a detour or stride over when it runs into an obstacle, it is suitable for applications, such as robots, autonomous mobile platforms, or robotic vacuum cleaners, etc. An intelligent vacuum cleaner can substantially improve the quality and convenience of our lives since it can maneuver around obstacles, e.g. furniture, in our household while cleaning floors, moreover, it can clean those dead spots that are not accessible using conventional cleaning tools as it can enter areas beneath larger furniture, such as beds, sofas, and so on.

From the above description, it is noted that the focal point of designing a good robotic mobile intelligent device is the ability to detect the conditions of roads automatically and independently. Usually, conventional robotic mobile apparatuses detect obstacle by emitting ultrasonic waves or infrared light. However, such ultrasonic or infrared sensors can only detect and sense obstacles blocking its moving path and plan a detour accordingly, they are not capable of detecting road conditions on its moving path and thus adjusting its moving speed accordingly.

Another detection method commonly being adopted by those conventional robotic mobile apparatuses is exercised by arranging an encoder on a DC motor for measuring that the rotation speed of the DC motor according to the pulse train of the encoder, and further controlling the output of the DC motor basing upon the road conditions analyzed with respect to the rotation speed. The two aforesaid detections all require the use of certain sensors for detecting and measuring certain external signals originating from ambient environment.

Therefore, it is intended in this invention to provide a method capable of detecting and measuring input impedance related to a DC motor while basing upon the detection/measurement to analyze the DC motor's output characteristics, that it can detect actual operating status of the DC motor without relying upon the detection of those torque sensors or rotation sensors currently available on the market, and thereby, not only the manufacturing cost of the DC motor can be reduced, but also the complication of designing a closed-circuit controller is minimized.

SUMMARY OF THE INVENTION

The object of the present invention is to provide a method for detecting output characteristics of a DC motor, which uses the detection of input impedance related to the DC motor while basing upon the detection/measurement to analyze the DC motor's output characteristics, that it can detect actual operating status of the DC motor through the output characteristics without relying upon the detection of those torque sensors or rotation sensors, and thereby, not only the manufacturing cost of the DC motor and the complication of designing a closed-circuit controller can be reduced, but also the detection error caused by the installation of those additional sensors is avoided.

Another object of the invention is to provide a method for controlling output characteristics of a DC motor, which uses the detection of input impedance related to the DC motor while basing upon the detection/measurement to evaluate the actual operating status of the DC motor and thus further control/adjust the output of the DC motor by altering the input impedance of the DC motor.

Yet, another object of the invention is to provide a self-propelled apparatus, being control by a control mechanism employing the aforesaid method for enabling the same to detect road conditions on its moving path in a dynamic manner without requiring the use of additional sensors for sensing the statuses of the DC motor, that it can maintain a specific moving speed by adjusting the output of the DC motor according to the detected road conditions on its moving path.

To achieve the above objects, the present invention provides a method for detecting output characteristics of a DC motor, which comprises the steps of: establishing an operator specifically for the DC motor by defining the operator to represent a transformation relation between an input impedance and one of the output characteristics of the DC motor; detecting the input impedance of the operating DC motor; and converting the detected input impedance into the output characteristics by the operator.

In addition, the present invention also provides a method for controlling output characteristics of a DC motor, which comprises the steps of: establishing an operator specifically for the DC motor by defining the operator to represent a transformation relation between an input impedance and one of output characteristics of the DC motor; detecting the input impedance of the operating DC motor; converting the detected input impedance into the output characteristics by the operator; making an evaluation to determine whether the output characteristics match an operation specification; adjusting the input impedance for altering the corresponding output characteristics if the output characteristics are not matched with the operation specification.

Moreover, the present invention provides a self-propelled apparatus, which comprises: a DC motor, mounted on a carrier and featured by output characteristic; at least a driving wheel, capable of driving the carrier to move according to the output characteristic received thereby; and a motion control unit, mounted on the carrier while coupling with the DC motor, capable of detecting an input impedance of the DC motor while the DC motor is operating, and then using an operator to convert the detected input impedance into the output characteristics; wherein, the motion control unit is capable of altering the output characteristics to match with an operation specification.

Further scope of applicability of the present application will become more apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

BRIEF DESCRIPTION OF THE DRAWINGS

The present invention will become more fully understood from the detailed description given herein below and the accompanying drawings which are given by way of illustration only, and thus are not limitative of the present invention and wherein:

FIG. 3B is a flow chart depicting steps of a test method used for acquiring an operator of the invention.

DESCRIPTION OF THE EXEMPLARY EMBODIMENTS

For your esteemed members of reviewing committee to further understand and recognize the fulfilled functions and structural characteristics of the invention, several exemplary embodiments cooperating with detailed description are presented as the follows.

Figure 1:
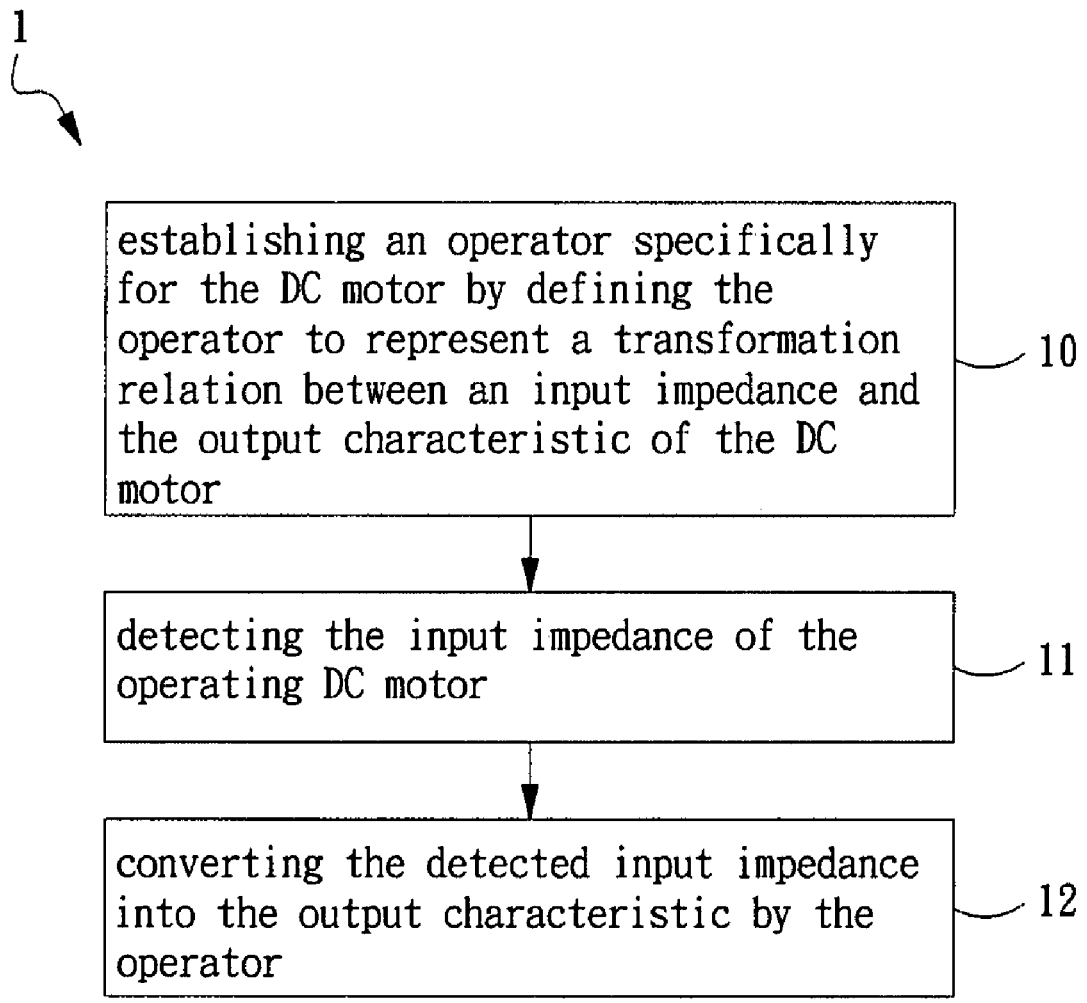
FIG. 1 is a flow chart depicting steps of a method for detecting output characteristics of a DC motor according to an exemplary embodiment of the invention.

Please refer to FIG. 1, which is a flow chart depicting steps of a method for detecting output characteristics of a DC motor according to an exemplary embodiment of the invention. As shown in FIG. 1, the flow starts at step 10. In step 10, an operator specifically for the DC motor is established in a manner that the operator is defined to represent a transformation relation between an input impedance and the output characteristics of the DC motor, whereas the input impedance is the voltage and current that are used for driving the DC motor, and the output characteristic is an attribute selected from the group consisting of an output torque of the DC motor, a rotation speed of the DC motor, and the combination thereof; and then the flow proceeds to step 11.

Figure 2:
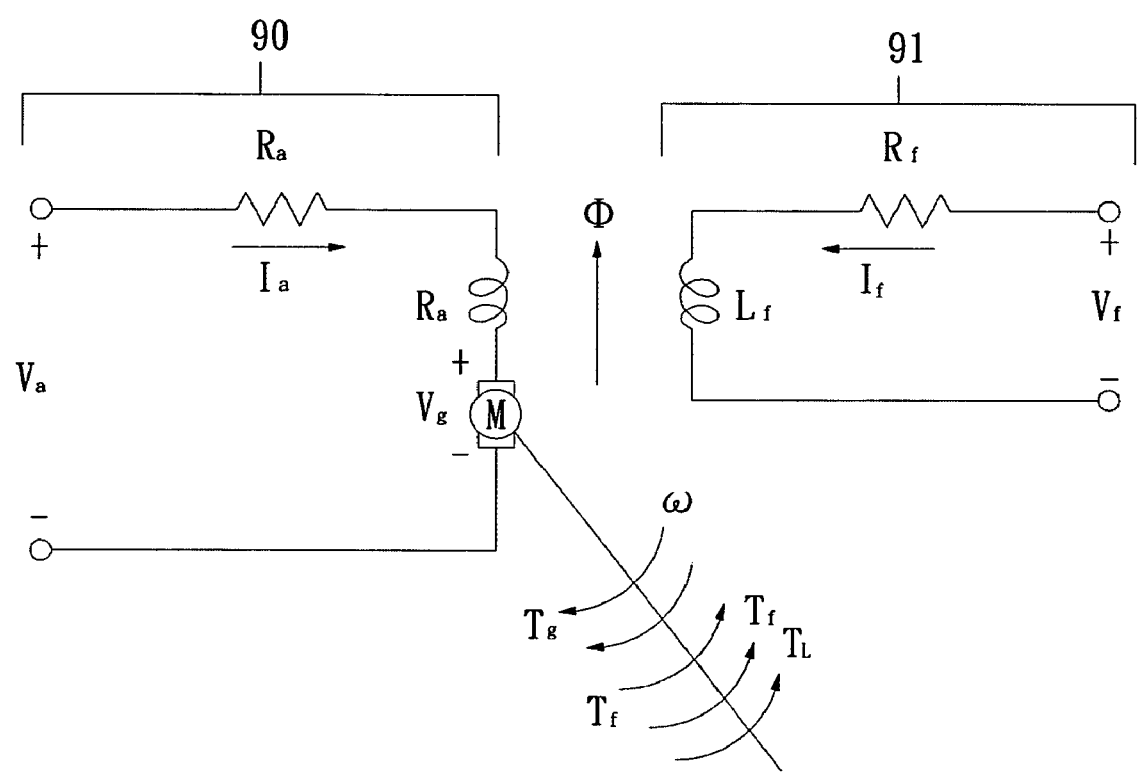
FIG. 2 is an equivalent circuit diagram of a DC Motor used in the invention.

For detailing the establishing of the operator, please refer to an equivalent circuit diagram of a DC motor used in the invention as shown in FIG. 2. For clarity, every symbol used in the equivalent circuit diagram of FIG. 2 is elaborated in the following table 1. Basically, the equivalent circuit of the DC motor includes a circuitry 90 composed of an inductance, a resistance and an inductive DC motor, and another circuitry 91, being substantially an induction circuit.

| Symbol | description |
|---|---|
| $V_a$ | Input Voltage |
| $I_a$ | Input current |
| $R_a$ | Motor Resistnace |
| $L_a$ | Motor Inductance |
| $T_g$ | Motor Torque |
| $K_T$ | Torque Constant |
| $\omega$ | Motor Rotation Speed |
| $K_E$ | Back-EMF constant |
| $V_g$ | Back-EMF Voltage |
| B | Dynamic Damping Factor |
| J | Rotation Inertia |
| $T_f$ | Static Friction Torque |
| $T_L$ | Load Torque |

As extrapolating from that shown in FIG. 2, the electromechanical transduction of the DC motor is represented as following:

$$\begin{Bmatrix} V_a \\ I_a \end{Bmatrix} = [t] \begin{Bmatrix} -T_g \\ \omega \end{Bmatrix} \quad (1)$$

wherein [t] is an electro-mechanical transduction matrix X, which is also the operator being established in step 10 of FIG. 1

The operator [t] can be defined as following:

$$[t] = \begin{bmatrix} -\dfrac{L_a s + R_a}{K_T} & K_E \\ -\dfrac{1}{K_T} & 0 \end{bmatrix} \quad (2)$$

wherein s represents a Laplace Transform.

From the above description, it is noted that the operator is a matrix including components of a torque constant $K_T$, a back electromotive force constant $K_E$, an inductance $L_a$ of the DC motor, and a resistance $R_a$ of the DC motor. Since $K_T$, $K_E$, $L_a$, and $R_a$ are all relating to the characteristics of the DC motor, the operator can be acquired from the specification provided by the manufacture of the DC motor.

In addition, the operator [t] can be defined as illustrated in the following formulas:

$$t_{11} = \dfrac{V_a}{-T_g}\bigg|_{\omega=0} \quad (3)$$

$$t_{12} = \dfrac{V_a}{\omega}\bigg|_{T_g=0} \quad (4)$$

$$t_{21} = \dfrac{I_a}{-T_g}\bigg|_{\omega=0} \quad (5)$$

$$t_{22} = \dfrac{I_a}{\omega}\bigg|_{T_g=0} \quad (6)$$

Thus, it can be concluded as following:

$$\begin{Bmatrix} V_a \\ I_a \end{Bmatrix} = \begin{bmatrix} t_{11} & t_{12} \\ t_{21} & t_{22} \end{bmatrix} \begin{Bmatrix} -T_g \\ \omega \end{Bmatrix} \quad (7)$$

Figure 3A:
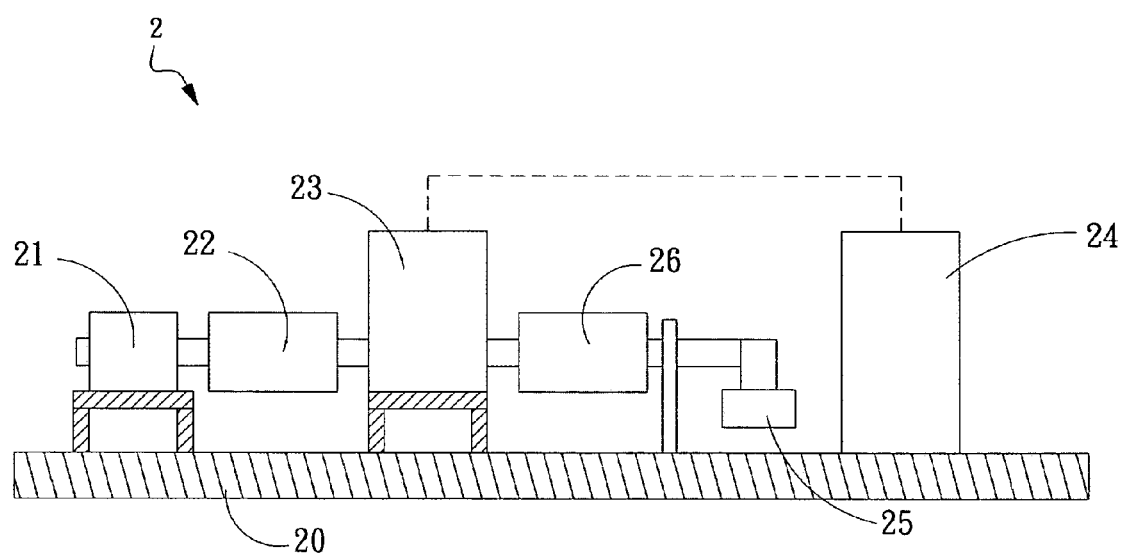
FIG. 3A is a schematic diagram showing a test apparatus used for acquiring parameters of an operator of the invention.

Therefore, other then obtaining from the specification provided by the manufacture of the DC motor as shown in formula (2), the operator can be obtained through experiments as the parameters of formula (7) can be acquired thereby. Please refer to FIG. 3A, which is a schematic diagram showing a test apparatus used for acquiring parameters of an operator of the invention. The test apparatus 2 is substantially a platform 20 having a DC motor 21, a torque meter 23, and a torque converter 24. In the test apparatus, all the DC motor 21, the torque meter 23, and the torque converter 24 are mounted on the platform 20 in a manner that the DC motor 21 is coupled to the torque meter 23 by a coupling 22 while the torque meter 23 is electrically connected to the torque converter 24. In addition, a load 25 is connected to an end of the torque meter 23 opposite to that coupled to the DC motor 21 by another coupling 26.

Please refer to FIG. 3B, which is a flow chart depicting steps of a test method used for acquiring an operator of the invention. The test method for acquiring an operator starts at step 31. In step 31, an input characteristic of the DC motor is altered and a sensing device is used to detect an output torque and a rotation speed of the DC motor for obtaining a plural set of numerical data including voltage, current, torque and rotation speed; and then the flow proceeds to step 31. In an exemplary embodiment of the invention, the input characteristic of the DC motor includes attributes relating to inputting voltage, inputting current and loading of the DC motor. That is, any variation in the input impedance of the DC motor 21 means that the input voltage, current and load of the DC motor 21 as well as the output torque and rotation speed detected from the DC motor 21 by the torque meter 3 are changed, and by detecting that a plural set of numerical data including voltage, current, torque and rotation speed can be obtained while each set is corresponded to one variation of the input impedance.

In step 32, a numerical analyzing technique is performed upon the plural set of numerical data for obtaining the operator, i.e. by the use of the aforesaid formulas (3)~(6) upon the plural set of numerical data, an operator of two by two matrix can be obtained. In an exemplary embodiment of the invention, the numerical analyzing technique is a least square method, but is not limited thereby.

Back to FIG. 1 that the step 11 will be executed after the processing of the step 10. In step 11, the input impedance is being detected while the operating DC motor is operating, i.e. the voltage and current of the operating DC motor is being detected; and then the flow proceeds to step 12. In step 12, the detected input impedance is converted into the output characteristics by the operator, by which the output torque and rotation speed of the DC motor can be acquired according to the voltage and current detected in step 11. It is noted that the operator used in step 12 can be either the one defined by formula (2) or the one defined by formula (7).

Figure 4:
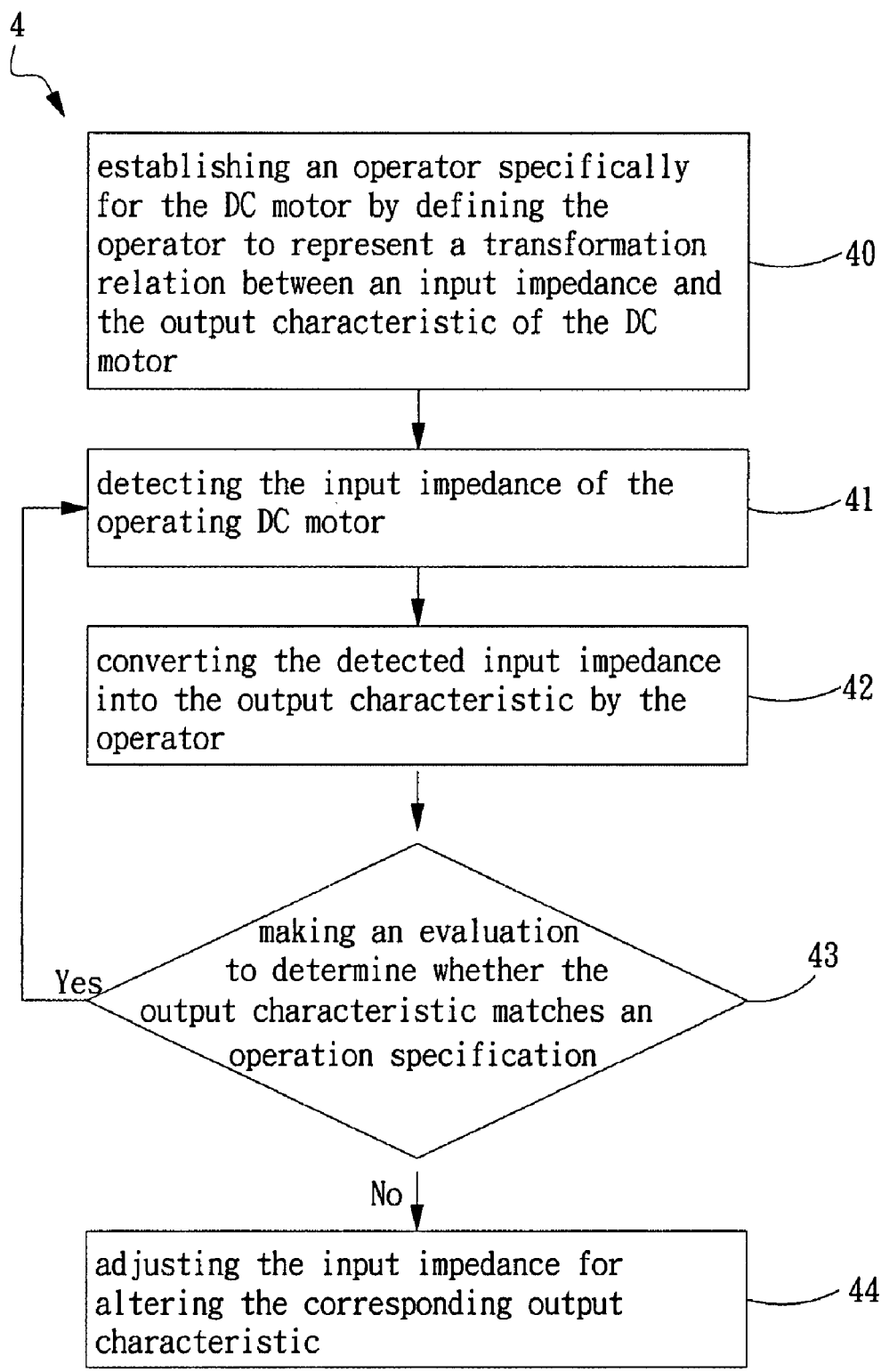
FIG. 4 is a flow chart depicting steps of a method for controlling output characteristics of a DC motor according to an exemplary embodiment of the invention.

Please refer to FIG. 4, which is a flow chart depicting steps of a method for controlling output characteristics of a DC motor according to an exemplary embodiment of the invention. The controlling method starts at step 40. In step 40, an operator specifically for the DC motor is established in a manner that the operator is defined to represent a transformation relation between the input impedance and the output characteristics of the DC motor; and then the flow proceeds to step 41. In step 41, the input impedance is being detected while the operating DC motor is operating, i.e. the voltage and current of the operating DC motor is being detected; and then the flow proceeds to step 42. In step 42, the detected input impedance is converted into the output characteristics by the operator; and then the flow proceeds to step 43. It is noted that the performing of step 41 to step 42 is the same as those shown in FIG. 1, and thus is not described further herein.

In step 43, an evaluation is being made to determine whether the output characteristics match an operation specification; if so, the flow proceeds back to step 41; otherwise, the flow proceeds to step 44. In step 44, the input impedance is adjusted, by which the voltage and current used for driving the DC motor can be changed in a controlled manner so that the corresponding output characteristics of the DC motor is changed.

Figure 5A:
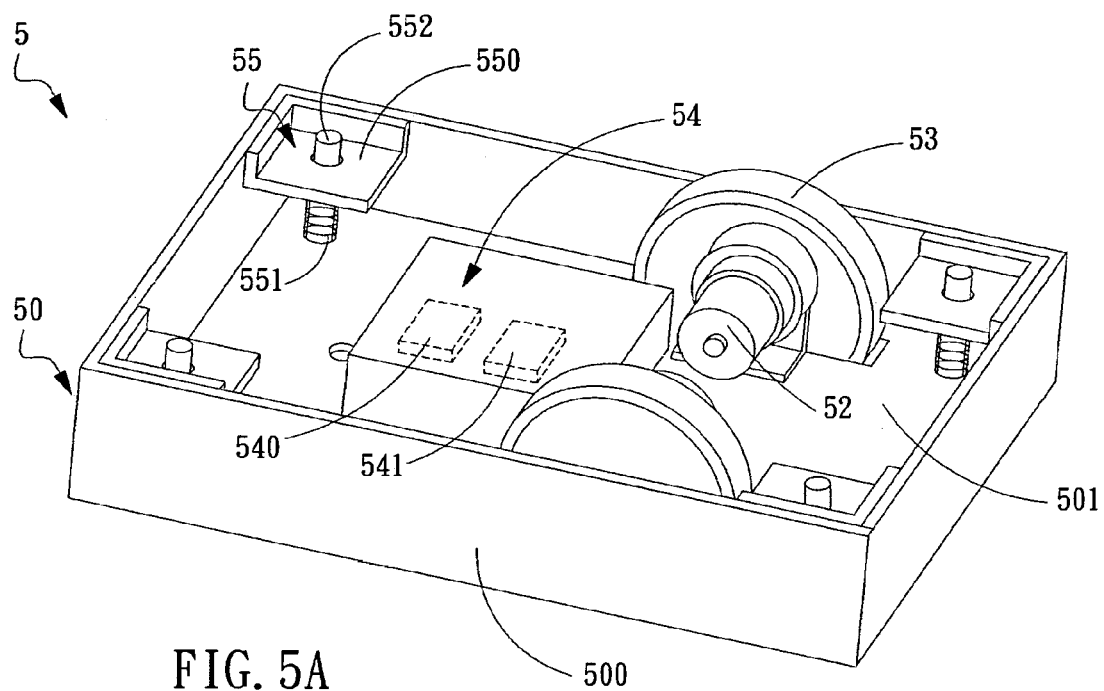
FIG. 5A shows a self-propelled apparatus according to a first embodiment of the invention.
Figure 5B:
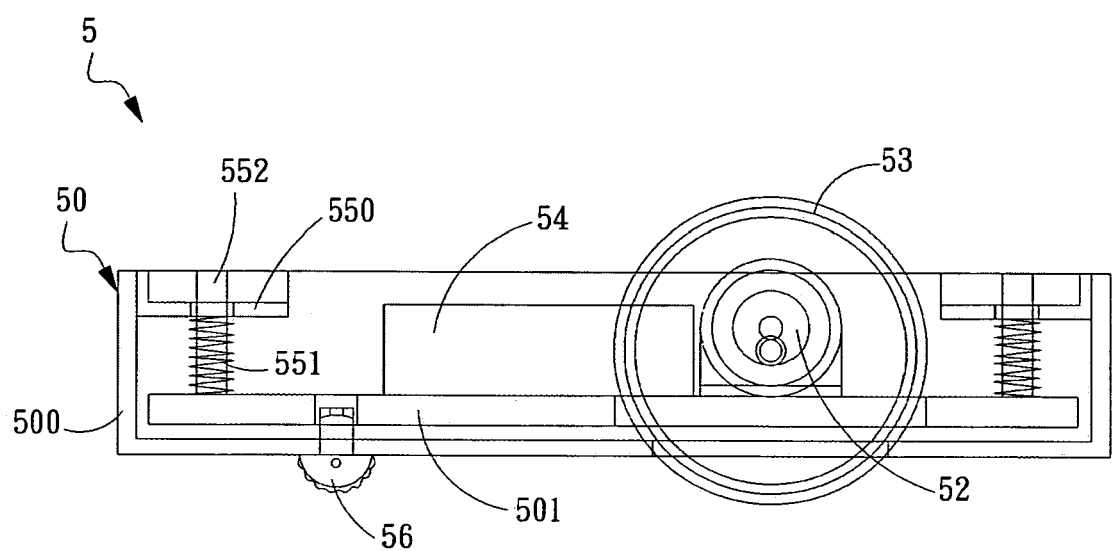
FIG. 5B is a side view of FIG. 5A.

Please refer to FIG. 5A and FIG. 5B, which show a self-propelled apparatus according to a first embodiment of the invention. In FIG. 5A and FIG. 5B, a self-propelled apparatus 5 is composed of: a carrier 50, a pair of DC motors 52, a pair of driving wheels 53 and a motion control unit 54; wherein the carrier is further comprised of a case 500, a bottom plate 501 and a plurality of suspending units 55. In this exemplary embodiment, each suspending unit 55 is composed of a fixing part 550, an elastic buffering part 551 and a axle-like part 552, in which the fixing part 550 is connected to the case 500, the two ends of the elastic buffering part 551 are respectively abutted against the fixing part 551 and the bottom plate 501, and the axle part 552, being sheathed by the elastic buffering part 551, is connected to the fixing part 551 and the bottom plate 501. As shown in FIG. 5A, the elastic buffering part 551 is a spring. By the use of the plural suspending units 55, the structure integrity and stability of the self-propelled apparatus can be maintained while it is operating on a rugged surface.

Each of the two DC motors 52 is mounted on the bottom plate 501 and capable of providing output characteristics including torque and rotation speed. In addition, each DC motor 52 is connected to its corresponding driving wheel 53 through a reduction gear box, so that each driving wheel 53 can receive the output characteristic of its corresponding DC motor 52 and thus drive the carrier 50 to move accordingly. The motion control unit 54, being also mounted on the bottom plate 501, is coupled to the pair of DC motors 52, by which the motion control unit 54 is able to detect an input impedance of each DC motor 52 while it is operating and then uses an operator to convert the detected input impedance into the output characteristic while analyzing and thus adjusting the DC motor's output characteristics for controlling the output of the DC motor.

The motion control unit 54 is further comprised of a detection circuit 540 and a processing device 541. The detection circuit 540 is used for detecting the input impedance of the operating DC motor 21 while generating a sensing signal according to the detection. The processing device 541 is coupled to the detection circuit 540 and used for receiving and processing the sensing signal. In an exemplary embodiment of the invention, the detection circuit 540 can be an analog input/output control circuit capable of detecting impedance of the operating DC motor 21 while generating a sensing signal according to the detection, and the processing unit 541 can be a device selected from the group consisting of a digital signal processor, a single-chip processor, and a micro computer.

In addition, there is at least a passive wheel 56 being mounted on the bottom plate 501, which is used for assisting the movement of the self-propelled apparatus 5. It is noted that the motion control unit 54 adopts the aforesaid detection/control method to control the movement of the self-propelled apparatus 5, so that the moving speed can be maintained at a constant speed no matter the self-propelled apparatus 5 is moving uphill or downhill, or even runs into an obstacle.

Figure 6:
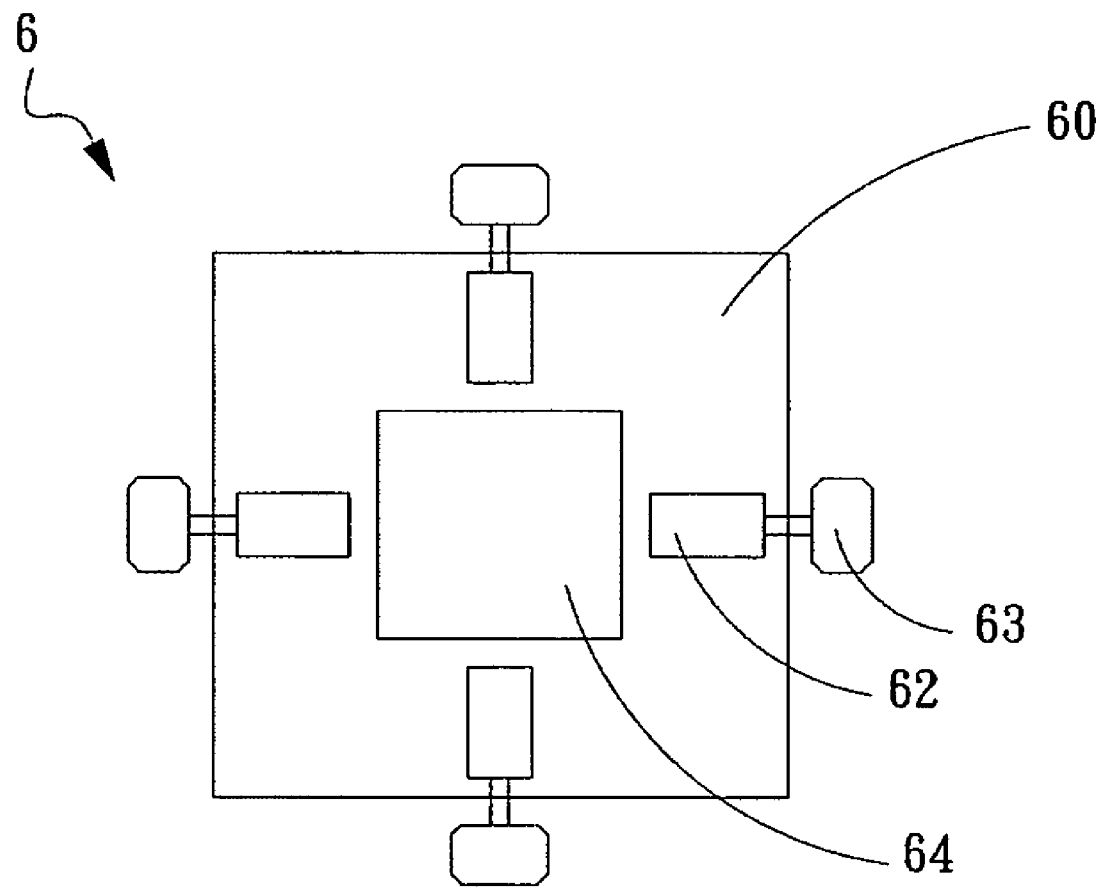
FIG. 6 shows a self-propelled apparatus according to a second embodiment of the invention.

Please refer to FIG. 6, which shows a self-propelled apparatus according to a second embodiment of the invention. In this second embodiment, the self-propelled apparatus 6 is an omni-directional robotic device that is basically structured the same as that shown in FIG. 5A. However, the omni-directional robotic device 6 is featuring in that there are four modules, each including a DC motor 62, a driving wheel 63 and a motion control unit 64, being respectively disposed at positions corresponding to the four sidewalls of the carrier 50. In this exemplary embodiment, the driving wheel 63 is an omni-directional wheel, which is a composition of two conventional wheels with a series of rollers attached to its circumference, these rollers having an axis of rotation at 90° to the plane of the wheel in a plane parallel to the axis of rotation of the wheel. As well as moving forward and backward like conventional wheels, they allow sideways movement. The effect is that the wheel can move in any direction that it will roll with full force, but will also slide laterally with great ease. The omni-directional wheel is known to those skilled in the art and thus is not described further herein. In addition, the functionality of the motion control unit 64 is the same as that shown in FIG. 5, and thus is not described further herein.

To sum up, the present invention provides a method for detecting and controlling output characteristics of a DC motor is provided in the present invention, by which the self-propelled apparatus is controlled by a control mechanism employing the aforesaid method for enabling the same to recognize the output characteristics of its DC motor by the detection of the DC motor's input impedance without requiring the use of additional sensors for sensing the statuses of the DC motor, so that not only the self-propelled apparatus can maintain a specific moving speed by adjusting the output of the DC motor in response to different road conditions, but also the cost for controlling the DC motor is reduced and the control accuracy of the DC motor is enhanced.

While the exemplary embodiment of the invention has been set forth for the purpose of disclosure, modifications of the disclosed embodiment of the invention as well as other embodiments thereof may occur to those skilled in the art. Accordingly, the appended claims are intended to cover all embodiments which do not depart from the spirit and scope of the invention.

What is claimed is:

1. A method for detecting an output characteristic of a direct current (DC) motor, comprising the steps of:
   establishing an operator specifically for the DC motor by defining the operator to represent a transformation relation between an input impedance and the output characteristic of the DC motor;
   detecting the input impedance of the operating DC motor; and
   converting the detected input impedance into the output characteristic by the operator,
   wherein the establishment of the operator further comprises the steps of:
   altering an input characteristic of the DC motor while using a sensing device to detect an output torque and a rotation speed of the DC motor for obtaining a plural sets of numerical data including voltage, current, torque and rotation speed; and
   performing a numerical analyzing technique upon the plural set of numerical data for obtaining the operator.

2. The method of claim 1, wherein the detection of input impedance includes the measurements of voltage and current of the DC motor while the DC motor is operating.

3. The method of claim 1, wherein the output characteristic is an attribute selected from the group consisting of an output torque of the DC motor, a rotation speed of the DC motor, and the combination thereof.

4. The method of claim 1, wherein the input characteristic of the DC motor includes attributes relating to inputting voltage, inputting current and loading of the DC motor.

5. The method of claim 1, wherein the numerical analyzing technique is a least square method.

6. The method of claim 1, wherein the operator is a matrix including components of a torque constant, a back electromotive force constant, an inductance of the DC motor, and a resistance of the DC motor.

7. A method for controlling an output characteristic of a direct current (DC) motor, comprising the steps of:
   establishing an operator specifically for the DC motor by defining the operator to represent a transformation relation between an input impedance and the output characteristic of the DC motor;
   detecting the input impedance of the operating DC motor;
   converting the detected input impedance into the output characteristic by the operator;
   making an evaluation to determine whether the output characteristic matches an operation specification; and
   adjusting the input impedance for altering the corresponding output characteristic if the output characteristic is not matched with the operation specification
   wherein the establishment of the operator further comprises the steps of:
   altering an input characteristic of the DC motor while using a sensing device to detect an output torque and a rotation speed of the DC motor for obtaining a plural sets of numerical data including voltage, current, torque and rotation speed; and
   performing a numerical analyzing technique upon the plural set of numerical data for obtaining the operator.

8. The method of claim 7, wherein the detection of input impedance includes the measurements of voltage and current of the DC motor while the DC motor is operating.

9. The method of claim 7, wherein the output characteristic is an attribute selected from the group consisting of an output torque of the DC motor, a rotation speed of the DC motor, and the combination thereof.

10. The method of claim 7, wherein the input characteristic of the DC motor includes attributes relating to inputting voltage, inputting current and loading of the DC motor.

11. The method of claim 7, wherein the numerical analyzing technique is a least square method.

12. The method of claim 7, wherein the operator is a matrix including components of a torque constant, a back electromotive force constant, an inductance of the DC motor, and a resistance of the DC motor.

13. A method for detecting output characteristic of a direct current (DC) motor, comprising the steps of:
   establishing a at least two dimensional operator specifically for the DC motor by defining the operator to represent a transformation relation between a plurality of input impedances and at least two output characteristics of the DC motor;
   detecting the plurality of input impedances of the operating DC motor; and
   converting the detected plurality of input impedances into the output characteristics by the operator.

14. The method of claim 13, wherein the output characteristic is a combination of an output torque of the DC motor and a rotation speed of the DC motor.

15. The method of claim 13, wherein the operator is a matrix including components of a torque constant, a back electromotive force constant, an inductance of the DC motor, and a resistance of the DC motor.

16. A method for controlling output characteristic of a direct current (DC) motor, comprising the steps of:
   establishing a at least two dimensional operator specifically for the DC motor by defining the operator to represent a transformation relation between a plurality of input impedances and at least two output characteristics of the DC motor;
   detecting the input impedance of the operating DC motor;
   converting the detected input impedance into the output characteristic by the operator;
   making an evaluation to determine whether the output characteristic matches an operation specification; and
   adjusting the input impedance for altering the corresponding output characteristic if the output characteristic is not matched with the operation specification.

17. The method of claim 16, wherein the output characteristic is a combination of an output torque of the DC motor and a rotation speed of the DC motor.

18. The method of claim 16, wherein the operator is a matrix including components of a torque constant, a back electromotive force constant, an inductance of the DC motor, and a resistance of the DC motor.

* * * * *